(12) United States Patent
Weber

(10) Patent No.: US 9,625,944 B2
(45) Date of Patent: Apr. 18, 2017

(54) WATERPROOF PORT FOR ELECTRONIC DEVICES

(71) Applicant: Apple Inc., Cupertino, CA (US)

(72) Inventor: Douglas J. Weber, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 15/025,214

(22) PCT Filed: Sep. 29, 2013

(86) PCT No.: PCT/US2013/062509
§ 371 (c)(1),
(2) Date: Mar. 25, 2016

(87) PCT Pub. No.: WO2015/047359
PCT Pub. Date: Apr. 2, 2015

(65) Prior Publication Data
US 2016/0239047 A1 Aug. 18, 2016

(51) Int. Cl.
G06F 1/16 (2006.01)
H04M 1/03 (2006.01)
H04M 1/18 (2006.01)

(52) U.S. Cl.
CPC ............ G06F 1/163 (2013.01); G06F 1/1656 (2013.01); H04M 1/03 (2013.01); H04M 1/18 (2013.01)

(58) Field of Classification Search
CPC ........................................ G06F 1/163
USPC .................................... 361/679.09
See application file for complete search history.

(56) References Cited

U.S. PATENT DOCUMENTS

| 3,950,627 | A | 4/1976 | Murata et al. |
| 5,041,330 | A | 8/1991 | Heerten et al. |
| 5,179,505 | A | 1/1993 | Matsuo |
| 5,258,592 | A | 11/1993 | Nishikawa et al. |
| 5,373,487 | A | 12/1994 | Crawford et al. |

(Continued)

FOREIGN PATENT DOCUMENTS

| CN | 102565149 | 7/2012 |
| CN | 104517772 | 4/2015 |

(Continued)

OTHER PUBLICATIONS

U.S. Appl. No. 14/695,357, filed Apr. 24, 2015, pending.

(Continued)

Primary Examiner — Tuan T Dinh
Assistant Examiner — Rockshana Chowdhury
(74) Attorney, Agent, or Firm — Brownstein Hyatt Farber Schreck, LLP

(57) ABSTRACT

One embodiment of the present disclosure may take the form of an electronic device. The electronic device includes a housing defining a port and a cavity, a processing element contained within the cavity of the housing, an input/output device (such as, but not limited to, a sound wave transducer) in selective communication with the port, and a flow-blocking member movably connected to the housing. The flow-blocking member selectively prevents fluid-flow, such as the flow of air, through the port. The electronic device also includes a fluid repelling member connected to the housing and positioned in a flow path between the port and the input/output device.

20 Claims, 5 Drawing Sheets

(56) References Cited

U.S. PATENT DOCUMENTS

| | | | |
|---|---|---|---|
| 6,166,662 A | 12/2000 | Chuang | |
| 6,292,358 B1 * | 9/2001 | Lee | G06F 1/1616 292/42 |
| 6,389,143 B1 | 5/2002 | Leedom et al. | |
| 6,501,036 B2 | 12/2002 | Rochon et al. | |
| 6,855,173 B2 | 2/2005 | Ehrnsperger et al. | |
| 6,963,039 B1 | 11/2005 | Weng et al. | |
| 7,087,850 B1 | 8/2006 | Murzanski | |
| 7,230,196 B2 | 6/2007 | Toyama | |
| 7,355,137 B2 | 4/2008 | Kawasaki et al. | |
| 7,365,281 B2 | 4/2008 | Yamaguchi et al. | |
| 7,580,533 B2 | 8/2009 | Schwartz | |
| 7,748,272 B2 | 7/2010 | Kranz et al. | |
| 7,764,936 B2 | 7/2010 | Nakasono et al. | |
| 7,865,210 B2 | 1/2011 | Wang et al. | |
| 8,059,490 B2 | 11/2011 | Rapps et al. | |
| 8,092,691 B2 | 1/2012 | Youngs et al. | |
| D653,640 S | 2/2012 | Kwon et al. | |
| 8,231,795 B2 | 7/2012 | Martin et al. | |
| 8,263,886 B2 | 9/2012 | Lin et al. | |
| 8,371,866 B1 | 2/2013 | Su et al. | |
| 8,381,575 B2 | 2/2013 | Seo | |
| 8,416,542 B2 | 4/2013 | Nakamura | |
| 8,446,713 B2 | 5/2013 | Lai | |
| 8,462,514 B2 | 6/2013 | Myers et al. | |
| 8,470,252 B2 | 6/2013 | Odueyungbo | |
| 8,482,305 B2 | 7/2013 | Johnson | |
| 8,500,348 B2 | 8/2013 | Dumont et al. | |
| 8,526,175 B2 | 9/2013 | Yukawa et al. | |
| 8,562,095 B2 | 10/2013 | Alleyne et al. | |
| 8,591,240 B2 | 11/2013 | Jenks | |
| 8,614,897 B2 | 12/2013 | Tang | |
| 8,624,144 B2 | 1/2014 | Chiang | |
| 8,644,011 B2 | 2/2014 | Parkinson | |
| 8,683,861 B2 | 4/2014 | Humbert et al. | |
| 8,767,381 B2 | 7/2014 | Shukla et al. | |
| 8,770,996 B2 | 7/2014 | Hsu | |
| 8,800,764 B2 | 8/2014 | Wu | |
| 8,804,993 B2 | 8/2014 | Shukla et al. | |
| 8,826,558 B2 | 9/2014 | Priebe et al. | |
| 8,844,158 B2 | 9/2014 | Dehn | |
| 8,942,401 B2 | 1/2015 | Murayama | |
| 8,960,818 B2 | 2/2015 | Myers et al. | |
| 8,994,827 B2 | 3/2015 | Mistry et al. | |
| 9,013,888 B2 | 4/2015 | Trzaskos et al. | |
| 9,072,991 B2 | 7/2015 | Winters et al. | |
| 9,080,961 B2 | 7/2015 | Adachi | |
| 9,084,053 B2 | 7/2015 | Parkins | |
| 9,084,357 B2 | 7/2015 | Shedletsky et al. | |
| 9,099,264 B2 | 8/2015 | Shedletsky et al. | |
| 9,105,420 B2 | 8/2015 | Shah et al. | |
| 9,129,757 B2 | 9/2015 | Kanbayashi et al. | |
| 9,161,434 B2 | 10/2015 | Merz et al. | |
| 9,164,539 B2 | 10/2015 | Wu | |
| 9,171,535 B2 | 10/2015 | Abe et al. | |
| 9,226,076 B2 | 12/2015 | Lippert et al. | |
| 9,240,292 B1 | 1/2016 | Lapetina | |
| 9,253,297 B2 | 2/2016 | Abe et al. | |
| 9,335,355 B2 | 5/2016 | Menzel et al. | |
| 2006/0007647 A1 * | 1/2006 | Peng | G06F 1/1656 361/679.55 |
| 2006/0210062 A1 | 9/2006 | DeMichele et al. | |
| 2007/0003081 A1 | 1/2007 | Ram et al. | |
| 2008/0302641 A1 | 12/2008 | Su | |
| 2009/0281251 A1 | 11/2009 | Bae et al. | |
| 2010/0200456 A1 * | 8/2010 | Parkinson | B29C 33/485 206/701 |
| 2011/0192625 A1 * | 8/2011 | Hsu | G06F 1/1656 174/50 |
| 2012/0067711 A1 | 3/2012 | Yang | |
| 2013/0037396 A1 | 2/2013 | Yu | |
| 2013/0146491 A1 | 6/2013 | Ghali et al. | |
| 2013/0170685 A1 | 7/2013 | Oh et al. | |
| 2013/0242481 A1 | 9/2013 | Kim et al. | |
| 2014/0029206 A1 | 1/2014 | Wittenberg et al. | |
| 2014/0218877 A1 | 8/2014 | Wei et al. | |
| 2015/0003213 A1 | 1/2015 | Suwald | |
| 2016/0052017 A1 | 2/2016 | Weber et al. | |
| 2016/0241945 A1 | 8/2016 | Zadesky et al. | |

FOREIGN PATENT DOCUMENTS

| | | |
|---|---|---|
| CN | 105049966 | 11/2015 |
| CN | 204906680 | 12/2015 |
| CN | 105323674 | 2/2016 |
| EP | 0799747 A2 * | 10/1997 |
| EP | 2326106 | 5/2011 |
| EP | 2640042 | 9/2013 |
| JP | S5620399 | 2/1981 |
| JP | 200353872 | 2/2003 |
| JP | 200483811 | 3/2004 |
| JP | 2004235724 | 8/2004 |
| JP | 2004244607 | 9/2004 |
| JP | 2011187298 | 9/2011 |
| JP | 2012253426 | 12/2012 |
| WO | WO2012/117476 | 9/2012 |
| WO | WO2015/167848 | 11/2015 |

OTHER PUBLICATIONS

U.S. Appl. No. 14/805,035, filed Jul. 21, 2015, pending.
U.S. Appl. No. 14/814,606, filed Jul. 31, 2015, pending.
U.S. Appl. No. 15/023,957, filed Mar. 22, 2016, pending.
International Search Report and Written Opinion, PCT/US2013/062509, 15 pages, Sep. 1, 2014.
Author Unknown, "What to Do when Gadgets Get Wet," http://gadgetshow.channel15.com/gadget-show/blog/what-to-do-when-gadgets-get-wet, 2 pages, Aug. 23, 2010.

* cited by examiner

WATERPROOF PORT FOR ELECTRONIC DEVICES

CROSS-REFERENCE TO RELATED APPLICATION

This application is a 35 U.S.C. 371 application of PCT Patent Application No. PCT/US2013/062509, filed Sep. 29, 2013 and titled "Waterproof Port for Electronic Devices," the disclosure of which is hereby incorporated herein by reference in its entirety.

TECHNICAL HELD

The present invention relates generally to a port for an electronic device, and, more specifically, to waterproof ports and apertures for electronic devices.

BACKGROUND

Many types of electronic devices, such as smart phones, gaming devices, computers, watches, and the like, may include ports or openings to allow transmission of sound waves or to receive connectors. Some examples of these types of ports include microphone ports, speaker apertures, and headphone ports. During operation, some types of ports, such as microphone ports and speaker ports, require air flow between the enclosure of the electronic device in order to receive and/or transmit sound waves. The airflow pathway may also allow fluids, such as water, and/or debris to enter into the enclosure, which may damage internal components. Therefore, there is a need for a port or aperture that may prevent fluid ingress while still allowing airflow during operation.

SUMMARY

One example of the present disclosure includes an electronic device may take the form of an electronic device. The electronic device includes a housing defining a port and a cavity, a processing element contained within the cavity of the housing, an input/output device (such as, but not limited to, a sound wave transducer) in selective communication with the port, and a flow-blocking member movably connected to the housing. The flow-blocking member selectively prevents fluid-flow, such as the flow of air, through the port. The electronic device also includes a fluid repelling member connected to the housing and positioned in a flow path between the port and the input/output device.

Another example of the disclosure includes a wearable electronic device. The wearable electronic device comprises an enclosure defining a cavity, a processing element at least partially enclosed within the cavity, and a flow aperture configured to be in selectively fluid communication with the cavity. The wearable electronic device also includes a button assembly operably connected to the enclosure and configured to selectively prevent fluid flow through the flow aperture and a sound wave transducer, such as a microphone or speaker, is positioned within the cavity and is in selective fluid communication with the flow aperture.

Yet another example of the disclosure includes a portable electronic device. The portable electronic device includes a housing defining a cavity, a port defined in the housing, the port being in fluid communication with the cavity, a sound wave transducer in selective communication with the port, and a waterproof port assembly operably connected to the housing. The waterproof port assembly comprises a selectable component movable connected to the housing and a flow-blocking member operably connected to the selectable component and selectively positioned between the port and the sound wave transducer. During operation, movement of the selectable component causes movement of the flow-blocking member.

SPECIFICATION

Overview

Figure 1:
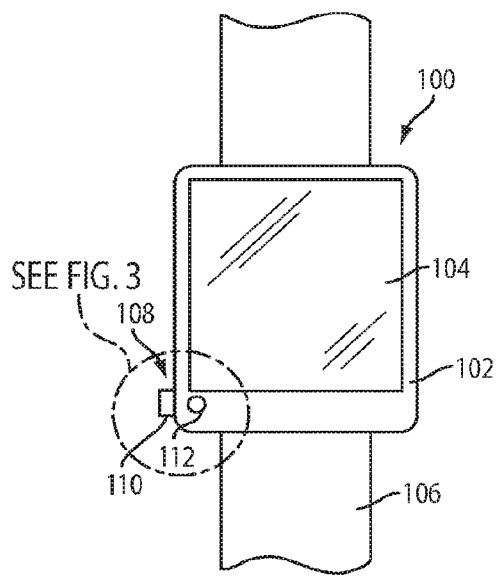
FIG. 1 is a front elevation view of an electronic device including the waterproof port assembly.

Some embodiments herein may take the form of a compact electronic device, such as a wearable electronic device, smart phone, portable music player, gaming device, or the like, that incorporates a waterproof port or other type of aperture (collectively referred to herein as a "port"). In one embodiment, the waterproof port assembly includes an opening mechanism, such as a button or other selectable component, which selectively opens and closes a port. In the closed position, a flow-blocking member is positioned between an exterior of the electronic device and an interior of the electronic device to block air, fluids, and debris from entering into the electronic device. In the open position, the flow blocking member is moved or otherwise repositioned to allow fluid flow between the exterior of the electronic device and the interior. By selectively opening and closing (e.g., repositioning the flow-blocking member), the waterproof port may prevent water flow into the electronic device, but may still allow open to allow airflow (such as sound waves) to reach one or more sensors in the electronic device. In some embodiments, the port may also facilitate an electronic connection between an internal contact and an external connector or plug. The aperture through which this connection is made may be selectively opened and closed, as well.

In addition to the flow-blocking member, the waterproof port assembly may further include a fluid repelling member, such as a fluid-blocking mesh or a semi-permeable membrane. The fluid repelling member helps to prevent fluids from entering the electronic device through the waterproof port when the flow blocking member is open. In this manner, in the open position, the waterproof port may allow airflow through the port, but may substantially prevent or reduce fluid flow therethrough (at least at atmospheric pressure). By using the flow-blocking member in combination with the fluid repelling member, the waterproof port assembly may better prevent fluids from entering into the port, especially when the port assembly experiences greater than atmospheric pressure, such as may be exerted when the device is submerged in water or another fluid. That is, in instances where the port may only include a fluid repelling mesh, the mesh may prevent fluids from entering into the cavity in normal conditions. However, in instances where pressure is exerted on the mesh, such as when the device is underwater, the fluid may enter through the mesh. With the waterproof port assembly, the flow-blocking member may act to prevent fluids from entering through the port, even under enhanced (e.g., greater than atmospheric) pressure.

In some embodiments, the flow-blocking member may be selectively activated by depressing or otherwise interacting with a button, although other input mechanisms (slides, switches, wheels, and the like) may be used in other embodiments. For example, a button may be operably connected to the flow-blocking member and, as a user selects the button, the button may in turn cause the flow-blocking member to be repositioned so as to open/close the port.

As another example, the flow-blocking member may be formed integrally with the button. In this example, the button may be configured to allow fluid flow into the port in the open position, but prevent fluid flow in the closed position. As a first example, the button may be depressed into or sub-flush with respect to the enclosure of the electronic device, thereby defining flow pathway between the sidewalls of the button and the sides of the aperture into which the button moves. As a second example, the button may include a flow-directing groove or aperture defined therein. When the button is in a selected position, such as a compressed position, the flow groove or aperture may be positioned to allow air flow into and through the port.

The waterproof button assembly may further include a biasing mechanism. The biasing mechanism, one example of which is a spring, acts to return the flow-blocking member to a default position. In some embodiments, this default position may block or close the port. The biasing mechanism may be configured to allow the port to remain open for a select period of time. For example, the biasing mechanism may be a damped spring that may slowly return the button and/or flow blocking member to the closed position.

As another example, the biasing member may be an electronic component that can selectively open and close the port by selectively moving the flow blocking member. Some examples of an electronic component that can be used to move the flow blocking member include a motor, servo, or an electromagnet. In this example, the biasing member may prevent the flow blocking member from being moved from a blocking position relative to the port under certain conditions, such as when the exterior pressure exceeds a certain threshold. Continuing with this example, the biasing member may prevent the flow-blocking member from unblocking the port when the device is underwater, which may prevent fluids from being transmitted into the port accidentally. Alternatively or additionally, in embodiments where the biasing member is an electronic component, the biasing member may selectively move the flow-blocking member to allow flow through the port. As an example, the biasing member may move the flow-blocking member to open the port when a certain application or function is activated on the electronic device.

The waterproof port may be used to communicate fluid or energy, such as sound waves, to and/or from the electronic device. As a first example, the electronic device may include a microphone positioned beneath the waterproof port or in another location that may be in audible communication with the waterproof port. In this example, sound waves may be transmitted (such as vocal sounds) through the port to reach the microphone positioned within an enclosure of the electronic device. By selectively opening and closing the port (e.g., by moving the flow-blocking member), sound waves may be in audible communication with the microphone when the port is open, but fluids may be prevented from entering into the enclosure and potentially damaging the microphone when the port is closed.

As a second example, the electronic device may include a speaker positioned in audible communication with the waterproof port. In this example, sound waves produced by the speaker may be selectively transmitted through the waterproof port to an exterior of the electronic device when the port is open, but fluids may prevented from being transmitted into the enclosure when the port is closed. In particular, the waterproof port assembly may be used in instances where a sound transducer is located within the electronic device and generates audio intended to be heard outside the housing, but where the electronic device may be used in certain environments, such as being underwater, the port may be closed to prevent fluid from entering into the device via the port.

In other embodiments the waterproof port may be used as an input/output connection port for the electronic device. In these embodiments, the waterproof port may be opened to allow a connector, such as, but not limited to, an audio jack, a plug, a universal serial bus connector, or the like, to be received therein. However, when the waterproof port is not in use, the flow-blocking member may cover the opening to prevent air, fluid, and debris from entering the opening.

Turning now to the figures, an illustrative electronic device the waterproof port assembly will now be discussed in more detail. FIG. 1 is a top plan view of an electronic device 100 including the waterproof port assembly. As discussed above, the waterproof port assembly selectively opens and closes a port to allow the electronic device to be substantially waterproof, while still including the airflow features of a port. With reference to FIG. 1, the electronic device 100 may include a housing 102, a display 104, a band 106, the waterproof port assembly 108, a selectable component 110, and a port 112. As shown in FIG. 1, the electronic device 100 is a wearable component, such as watch. However, in other embodiments, the electronic device 100 may be a smart phone, a portable music and/or video player, a laptop or tablet computer, or the like. As such, although the below description is made with reference to a wearable device such as that shown in FIG. 1, many other embodiments incorporating the waterproof port assembly 108 are envisioned.

The housing 102 may form a hub or main body for the electronic device 100 and may enclose one or more integral components (such as, but not limited to, one or more processors, storage components, etc.). The housing 102 may be integrally formed, two or more components connected together, or other variations of enclosures. The display 104 is a visual display element such as a liquid crystal display, plasma display, or the like. Additionally, in some embodiments, the display 104 may include input functionality, and may include a multi-touch input system, such as a capacitive input screen. The display 104 may be connected to the housing 102 and be positioned on a front of the housing 102.

Figure 2:
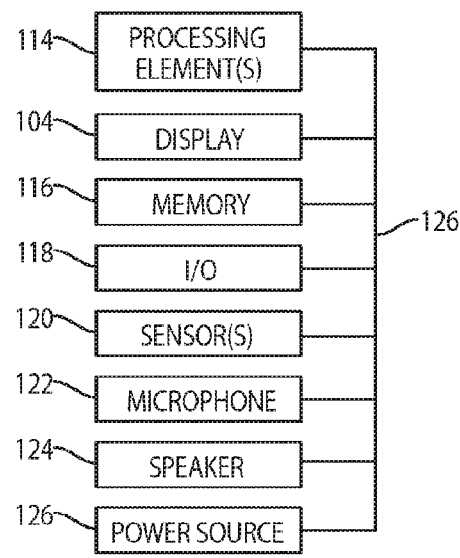
FIG. 2 is a simplified block diagram of the electronic device of FIG. 1.

The electronic device 100 may include a plurality of electronic components that may be enclosed within or attached to the housing 102. FIG. 2 is a simplified block diagram of the electronic device 100. With reference to FIG. 2, the electronic device 100 may include one or more processing elements 114, a memory component 116, an input/output component 118, one or more sensors 129, a microphone 122, a speaker 124, and/or power source 126. The components or groups of components may be in electrical communication with one another, such as through one or more system busses 126, electrical traces, wirelessly, or the like.

The power source 126 provides power to the components of the electronic device 100. The power source 126 may be a battery, solar panel, or other portable power element. Additionally, the power source 126 may be rechargeable or replaceable.

The processing element 114 or processor is substantially any type of device that can receive and execute instructions. For example, the processing element 114 may be a processor, microcomputer, or the like. Additionally, the processing element 114 may include one or more processors and in some embodiments may include multiple processing elements.

The one or more sensors 120 may be configured to sense a number of different parameters or characteristics that may be used to influence one or more operations of the electronic device 100. For example, the sensors 120 may include accelerometers, gyroscopes, capacitive sensors, light sensors, image sensors, pressure or force sensors, or the like. As will be discussed in more detail below, one or more of the sensors 120 may be used in conjunction with the waterproof port assembly 108 to selectively close and open the port, as well as receive user input therefrom.

With continued reference to FIG. 2, the memory component 116 stores electronic data that may be utilized by the electronic device 100. For example, the memory component 116 may store electrical data or content—e.g., audio files, video files, document files, and so on-corresponding to various applications. The memory 116 may be, for example, non-volatile storage, a magnetic storage medium, optical storage medium, magneto-optical storage medium, read only memory, random access memory, erasable programmable memory, or flash memory.

The input/output interface 118 may receive data from a user or one or more other electronic devices. Additionally, the input/output interface 118 may facilitate transmission of data to a user or to other electronic devices. For example, the input/output interface 118 may be used to receive data from a network, or may be used to send and transmit electronic signals via a wireless or wired connection (Internet, WiFi, Bluetooth, and Ethernet being a few examples). In some embodiments, the input/output interface 118 may support multiple network or communication mechanisms. For example, the network/communication interface 118 may pair with another device over a Bluetooth network to transfer signals to the other device, while simultaneously receiving data from a WiFi or other network.

The microphone 122 may be used in conjunction with the input port 112 to receive sound waves. The microphone 122 is configured to receive sound waves and transform them into electrical signals. In particular, the microphone 122 may be an acoustic-to-electric transducer or other sensor that converts sound into an electrical signal. As will be discussed in more detail below, the microphone 122 may be positioned to be in fluid communication with the port 112 such that the microphone 122 may receive sound waves through the housing 102.

The speaker 124 may also be used in conjunction with the input port 112 or through another input port. The speaker 124 creates sound waves from electrical signals. For example, the speaker 124 may be an electro-acoustic transducer that creates sound in response to an electrical audio signal.

With reference again to FIG. 1 in embodiments where the electronic device 100 is wearable, the electronic device 100 may include a band 106, such as a wrist band, arm band, or the like, that secures the electronic device 100 to a person or structure. The band 106 may connect to the housing 102 and may include attachment elements, such as a buckle, hook and loop, fasteners, or clasps, that connect the ends of the band 106 to each other. The length of the band 106 and/or attachment elements may be varied as desired.

Figure 3:
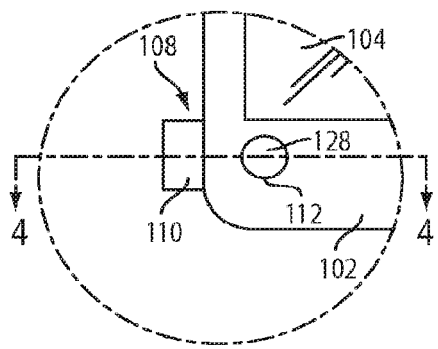
FIG. 3 is an enlarged view of the electronic device illustrating the waterproof port assembly.
Figure 4:
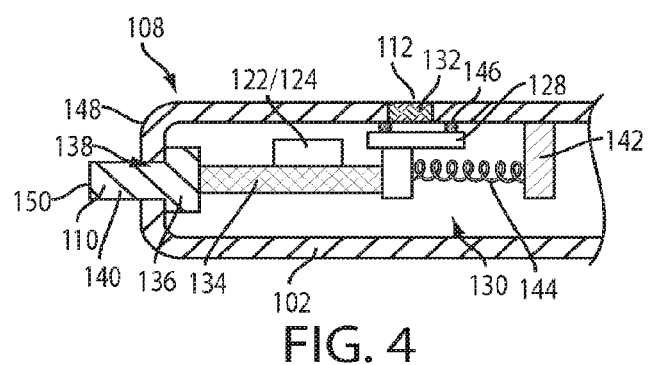
FIG. 4 is a cross-section view of the electronic device taken along line 4-4 in FIG. 3 illustrating a first example of the waterproof port assembly.

The waterproof port assembly 108 used to selectively open and close the port will now be discussed in further detail. FIG. 3 is an enlarged view of the electronic device of FIG. 1, illustrating select components of the waterproof port assembly 108. FIG. 4 is a cross-section view of the electronic device of FIG. 1 taken along line 4-4 in FIG. 3. With reference to FIGS. 3 and 4, the waterproof port assembly 108 may include the selectable component 110 and the port 112. The selectable component 110 is configured to receive a user input and may be movable, such as compressible, slidable, or rotatable. In the embodiment illustrated in FIGS. 3 and 4, the selectable component 110 may be a compressible button that translates laterally relative to a sidewall 148 of the housing 102. However, many other types movement are envisioned, at least some of which will be discussed below with respect to FIGS. 13A and 13B.

In some embodiments, the selectable component 110 may include a main body 140 and a base 136. The main body 140 may have a smaller diameter than the base 136, which as will be discussed in more detail below, may allow the base 136 to seal an aperture in the housing 102. For example, the base 136 may receive an O-ring or other sealing member that seals against the inner surface of the housing 102. In some embodiments, the selectable component 110 may have, in cross-section, a "T" shape. The top surface of the main body 140 may define a user engagement surface 150. The user engagement surface 150 may be configured to receive a user input to allow the selectable component 110 to be moved or selected.

An actuator 134 is operably connected to the selectable component 110 or may otherwise be configured to be selectively activated when the selectable component 110 is activated. The actuator 134 may be an at least partially rigid member that extends between the selectable element 110 and a flow-blocking member 128. The actuator 134 links the selectable component to the flow-blocking member and is configured to change the position of the flow-blocking member 128 upon activation of the selectable component 110. It should be noted that the actuator 134 is illustrated as a static element in FIG. 4, such as a rod. However, in some embodiments, the actuator 134 may be a variable element. For example, the actuator 134 may be an electrical motor, drive shaft for a motor, or the like. Examples of this type of actuator 134 will be discussed in more detail below.

With continued reference to FIGS. 3 and 4, the waterproof port assembly 108 may further include or otherwise incorporate, or cooperate with, the flow-blocking member 128. The flow-blocking member 128 acts as a cover or seal for the port 112. The flow blocking member 128 may be positioned on an interior of the housing 102 or an exterior of the housing 102. The flow-blocking member 128 may have a larger diameter than a diameter of the port 112, which allows the flow-blocking member 128 to better seal the interior of housing 102 from the port 112 when in the closed position. The flow-blocking member 128 may be formed of an impermeable material such that fluids, debris, and particles may be substantially prevented from passing therethrough, even under pressure.

A sealing member 146 may be associated with the flow-blocking member 128 and may be used to seal the perimeter of the flow-blocking member 128 against the sidewalls of the housing 102. The sealing member 146 may be an O-ring, cup-seal, elastomeric material, or the like.

In some embodiments, the waterproof port assembly 108 may further include a fluid repelling member 132. The fluid repelling member 132 may be semi-permeable and may allow sound waves to pass therethrough, but may repel fluids, such as water. For example, the fluid repelling member 132 may be a water-resistant mesh that covers the port 112. The fluid repelling member 132 may help to prevent fluids from entering through the housing 102 via the port 112 when the flow-blocking member 128 is in an open position.

With reference to FIG. 4, the waterproof port assembly 108 may also include a biasing member 144 operably connected to the actuator 134 and/or flow-blocking member 128. The biasing member 144 may be substantially any element that can exert a biasing force against the flow-blocking member 128 and actuator 134. In one embodiment, the biasing member 144 may be a spring, which can be compressed by the actuator 134 with a predetermined amount of force. Upon removal of the force, the biasing member 144 may return the actuator 134 to its original position. Other possible biasing members are, but are not limited to, a piston, a magnet, and the like.

In some embodiments, the biasing member 144 may be damped or otherwise configured to return the actuator 134 to a default position at a predetermined rate. In these embodiments, the flow-blocking member 128 may be returned to the closed position after a predetermined time period. This allows the port 112 to be opened for a predetermined period of time, but close automatically after the time expires. As one example, after opening, the biasing member may slowly exert a closing force on the flow-blocking member that closes the flow-blocking member after 30 seconds. However, in other embodiments, the biasing member may not be damped or may be damped to allow the flow-blocking member to return quickly to a closed position. In this example, port may remain open only as a user is exerting a force on the selectable component, or for a short time frame after the user removes the force.

With reference to FIGS. 3 and 4, the user engagement surface 150 and a portion of the main body 140 of the selectable component 110 may be received through a button aperture 138 defined in the sidewall 148 of the housing 102. The base 136 of the selectable component 136 may have a larger diameter than the button aperture 138 and may seal against the interior surface of the sidewall 148 to prevent fluids and/or debris from entering into a cavity 130 defined by the housing 102. The actuator 134 extends from and is operably connected to the base 136 of the selectable component 110. The microphone 122 and/or speaker 124 may be connected to the actuator 134 and may be movable with the actuator 134.

The actuator 134 connects to the flow-blocking member 128, which in turn is connected to the biasing member 144. A first end of the biasing member 144 is thus connected to the flow-blocking member 128 and a second end of the biasing member 144 may be anchored on a portion of the housing 102 or a support structure 142.

Operation of the waterproof port 108 assembly will now be discussed. With reference to FIG. 3, in a first position, the flow-blocking member 128 may be closed, sealing the port 112. In this position, the flow-blocking member 128 may substantially prevent fluids and debris from entering into the cavity 130 through the port 112. For example, as shown in FIG. 4, the flow-blocking member 128 may be positioned below the aperture defining the port 112 and the sealing member 146 may seal against the interior side of the housing 102 surrounding the port. The combination of the sealing member 146 and the flow-blocking member 128 may substantially prevent fluids from entering into the cavity 130. For example, the flow blocking member 128 may be larger than the port 112 and the sealing member 146 may seal the flow-blocking member against the housing 102, to prevent fluids from travel around the flow-blocking member 128 into the cavity 130. In the first position, the flow-blocking member 128 may hinder sound waves from being transmitted through the port 112.

Figure 5A:
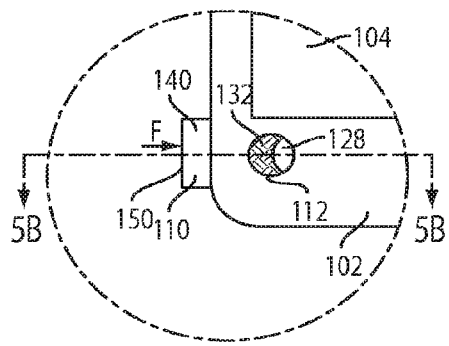
FIG. 5A is a front elevation view of the electronic device of FIG. 1 illustrating a flow-blocking member transitioning between an open position and a closed position.
Figure 5B:
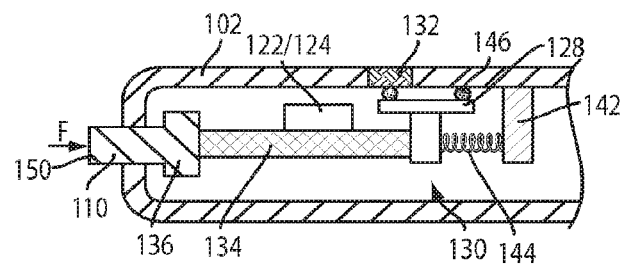
FIG. 5B is a cross-section view of the electronic device of FIG. 5A taken along line 5B-5B in FIG. 5A.

To open the port 112, the user may provide an input to the selectable component 110. FIG. 5A is an enlarged plan view of the electronic device 100 as a force is applied to the selectable component 110. Further, FIG. 5B is a simplified cross-section view of the electronic device taken along line 5B-5B in FIG. 5A. With reference to FIGS. 5A and 5B, as a force F is applied to the user engagement surface 150, the selectable component 110 moves laterally relative to the sidewall 150 and further into the cavity 130. Movement of the selectable component 110 causes the base 136 to transmit the force F to the actuator 134, thereby causing the actuator 134 to act on the flow-blocking member 128. The flow-blocking member 128 moves laterally within the housing 102 towards the support 142, compressing the biasing member 144. Compression of the biasing member 144 allows the flow-blocking member 128 to be displaced relative to the port 112. For example, as shown in FIG. 5A, the flow-blocking member 128 may be offset from the center of the port 112, such that the flow-blocking member 128 may only seal a portion of the port 112. In some embodiments, as shown in FIG. 5A, as the flow-blocking member 128 is moved, the cavity may be at least partially visible through the fluid repelling member.

Figure 6A:
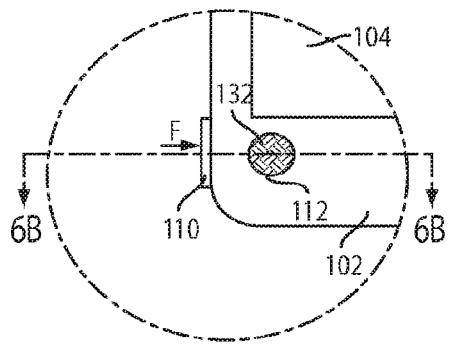
FIG. 6A is a front elevation view of the electronic device of FIG. 1 illustrating the flow-blocking member in the open position.
Figure 6B:
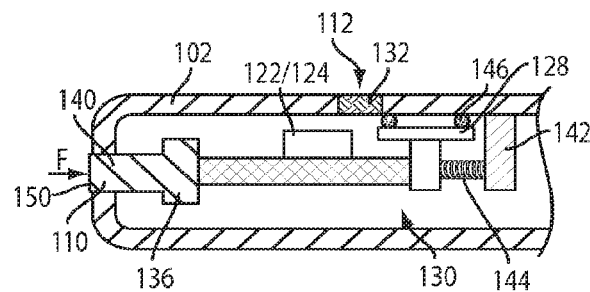
FIG. 6B is a cross-section view of the electronic device of FIG. 6A taken along line 6B-6B in FIG. 6A.

With reference to FIGS. 6A and 6B, as the force F continues to be applied the selectable component 110 transitions further into the cavity 130, moving the actuator 134 closer towards the support structure 142 and compressing the biasing member 144. The movement of the actuator 134 and the compression of the biasing member 144 moves the flow-blocking member 128 past the port 112. This allows the port 112 to become unblocked and thus allows sound waves and air to be transmitted therethrough. It should be noted that the fluid repelling member 132 may remain in position over the port 112 to prevent fluids from entering through the port 112, while still allowing sound waves to be transmitted therethrough. As shown in FIG. 6A, in some embodiments, in the open position, the flow-blocking member may allow the cavity to be visible through the mesh or other material of the repellent.

With reference to FIGS. 4 and 6B, when the force F is removed, the biasing member exerts a biasing force on the flow-blocking member 128 as the biasing member decompresses. As one example, in embodiments where the biasing member is a spring, as the spring stretches back out it pushes the flow-blocking member in a direction towards the sidewall 148 of the housing 102. The biasing force is then transmitted to the actuator 134, which forces the selectable component 110 to move towards the sidewall 148 and out of the cavity 130. The biasing force may be configured to return the selectable component 110 to its initial, decompressed position (as shown in FIG. 4).

In some embodiments, the biasing member 144 may be configured to exert a rate of force sufficient to close the flow-blocking member rapidly after the user force F is removed from the selectable component 110. In other words, the biasing member may be configured to control the speed that the flow-blocking member moves in transitioning from the open position to the closed position. In these examples, the port may remain open only as the user is compressing the selectable component 110. However, in other embodiments, as briefly mentioned above, the biasing member 144 may be configured to have a reduced rate of force. For example, the biasing member 144 may have an over-damped response. In these examples, the port may remain open for a predetermined time as determined by the over-damped response, even after the user removes the input force. This may allow the user to remove his or her input from the selectable component, while using the port to transmit sound waves or receive sound waves from the sound transducer (e.g., microphone or speaker). It should be noted that in other embodiments, the biasing member 144 may be configured to only activate the biasing force when initiated, such that the port may remain open until the user provides input to close the port.

Figure 7A:
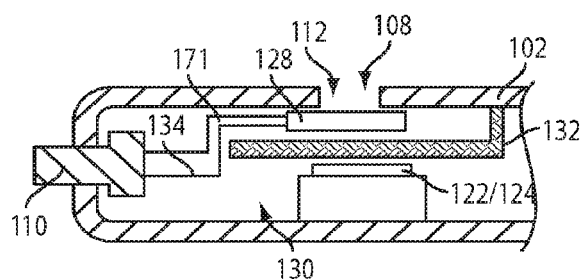
FIG. 7A is a cross-section view of the electronic device similar to the view shown in FIG. 4 illustrating a second example of the waterproof port assembly.
Figure 7B:
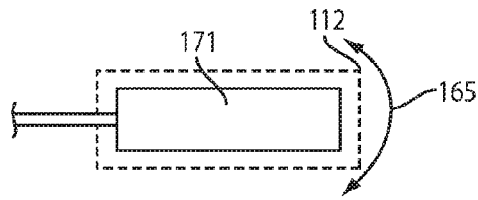
FIG. 7B is a simplified top plan view of the waterproof port assembly of FIG. 7A illustrating movement of a flow-blocking member relative to the port.

In some embodiments, the actuator 134 may pivot to selectively move the flow-blocking member 128. FIG. 7A is a simplified cross-section view of the waterproof port assembly including a pivoting flow-blocking member. FIG. 7B is a simplified top view of the flow-blocking member of FIG. 7A illustrating a movement path. With reference to FIG. 7A, in this example, the actuator 134 may include a pivot 171, such as a joint or flexible component, that connects to the flow-blocking member 128. The pivot 171 is configured to move the flow-blocking member along a path similar to the path 165 illustrated in FIG. 7B. This movement selectively aligns the flow-blocking member 128 with the port 112, to close/open the port 112.

In the example of FIG. 7A, the fluid repelling member 132 may be positioned beneath the flow-blocking member 128. In this manner, the fluid repelling member 132 may be exposed while the port 112 is open, which may prevent the fluid repelling member 132 from becoming saturated with fluids when the port is closed. In other words, in embodiments where the fluid repelling member may be positioned an exterior of the device 100 or remain exposed even while the flow-blocking member is covering the port, the device 100 may be underwater or otherwise exposed to volume of fluid, which could cause the fluid repelling member 132 to become saturated, which may reduce its effectiveness and/or cause wear over time.

Figure 8:
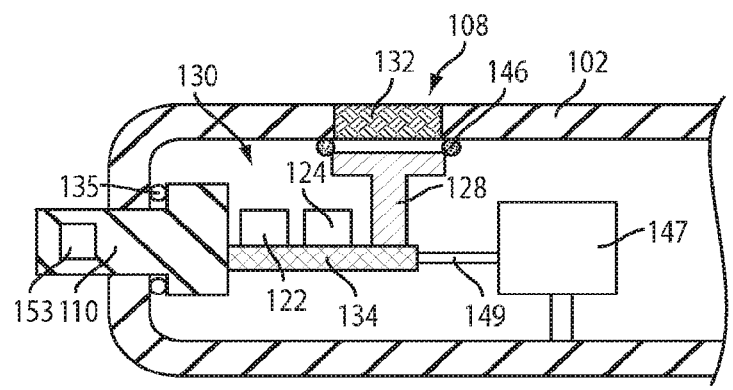
FIG. 8 is a cross-section view of the electronic device similar to the view shown in FIG. 4 illustrating another example of the biasing member of the waterproof port assembly.

In some embodiments, the biasing member may be an electromechanical component. FIG. 8 is a simplified cross-section view of the waterproof port assembly 108 including an electrically driven biasing member 147. With reference to FIG. 8, in this example, the biasing member 147 may be an electric motor, such as a solenoid, servo, or the like, and may include a drive shaft 149. The drive shaft 149 is operably connected to the actuator 134 and the flow-blocking member 128. In this example, the biasing member 144 may act to move the flow-blocking member 128, and optionally the actuator 134, to selectively open and close the port 112.

In one embodiment, the selectable component 110 may not be movable and/or may not be connected to the actuator 134. In this example, the selectable component 110 may include a sensor 153 that detects a user input to the user engagement surface 150 provides a signal to the biasing member 144 to open the port 112. As an example the sensor 153 may be a capacitive sensor, a force sensor, an accelerometer, or a gyroscope that detects the user input to the selectable component 110, such as a user touch, movement, or the like. The sensor 153 signal is then provided to processing element and/or biasing member to activate the biasing member 144. As the biasing member 144 is activated, the drive shaft 149 moves the flow-blocking member 128 laterally relative to the port 112. For example the drive shaft 149 causes the flow-blocking member 128 to translate within the housing 102. Additionally, the biasing member 144 may act to close the port 112 by moving the flow-blocking member 128 in an opposite direction.

In the example of FIG. 8, the selectable component 110 may not be movable and/or movement of the selectable component may not translate into direct movement of the flow-blocking member 128. This allows the flow-blocking member 128 to be automatically opened/closed based on a number of different inputs, not just user inputs to the selectable component 110. As an example, the biasing member 144 may open the input port 112 in response to an application being activated (e.g., a music playback application being activated, a voice memo recording application initiating, or the like). In these examples, the biasing member 144 may automatically open the port 112 by moving the flow-blocking member 128 when the application is activated and/or as the application requests. This may also allow the biasing member 144 to close the port 112 when the application requests, closes, or becomes inactive, or after a predetermined time period.

Figure 9A:
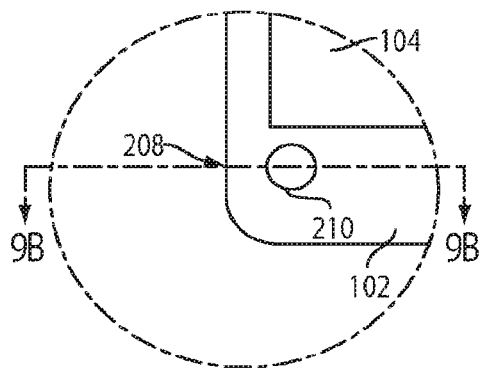
FIG. 9A is a front elevation view of the electronic device including a third example of the waterproof port assembly.
Figure 9B:
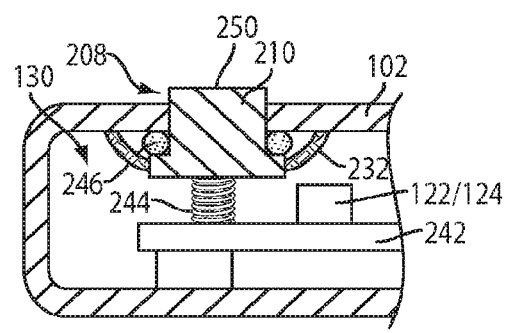
FIG. 9B is a cross-section view of the electronic device taken along line 9B-9B in FIG. 9A.
Figure 9C:
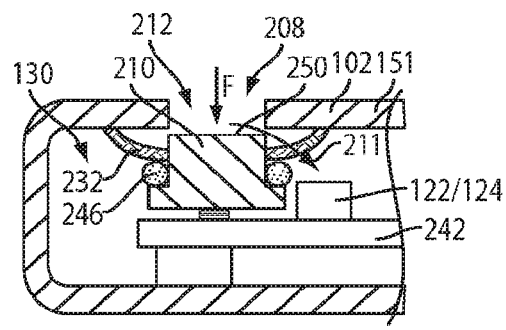
FIG. 9C is a cross-section view of the electronic device similar to the view illustrated in FIG. 9B illustrating a force applied to a selectable component.

In some embodiments, the selectable component may be positioned within the port. FIG. 9A is a top plan view of an example of the electronic device 100 with the selectable component positioned within the port. FIG. 9B is a simplified cross-section view of the electronic device taken along line 9B-9B in FIG. 9A. FIG. 9C is a simplified cross-section view of the electronic device similar to FIG. 9B with a force being applied to the selectable component. With reference initially to FIGS. 9A and 9B, in this example of the waterproof port assembly 208, the selectable component 210 may be received within an aperture defined in the housing 102. The aperture may define the port 212 and so the selectable component 210 may be positioned at a desired location for the port 212. For example, as shown in FIG. 9A, the selectable component 210 may be positioned on a top of the housing 102 adjacent the display 104, rather than on a side of the device 100 as in the example of FIG. 3. However, it should be noted, that the position of the selectable component in the embodiment herein may be varied as desired.

With continued reference to FIGS. 9A and 9B, in this example, the selectable component 210 may be substantially similar to the selectable component 110 and may include a sealing element 246 positioned around the body of the selectable component 210. In this example, the selectable component 210 may act as the flow-blocking member and may be formed of an impermeable material, to prevent fluids from entering into the cavity 130 when in the closed positioned.

The selectable component 210 may be connected to a biasing member 244 that may be supported on a support structure 242. The biasing member 244 may be substantially similar to the biasing member 144 illustrated in FIG. 4. In this example, the biasing member 244 may act directly on the selectable component 210 to return the selectable component 210 to an initial position (e.g., the position shown in FIG. 9B). The waterproof port assembly 208 may also include a fluid repelling member 232. In this example, the fluid repelling member 232 may be connected to the selectable component 210 and may be flexible. For example, the fluid repelling member 232 may be configured to stretch along to accommodate movement of the selectable component 210.

With reference to FIG. 9C, in operation, the user may apply a force F to the user engagement surface 250 formed on the top of the selectable component 210. As the force F is applied, the selectable component 210 may compress and move vertically relative to the top surface 151 of the housing 102. In the compressed position, an air flow path 211 is defined through the port 212 into the cavity 130. For example, the selectable component 210 may compress such that the engagement surface 250 may be positioned below the interior edge of the top surface 151 of the housing 102. This may allow air to flow into and out of the port 212 and may provide fluid communication between a device exterior and the microphone 122, speaker 124, or other input/output device positioned between the exterior of the housing 102 and the cavity 130. As such, the selectable component 210 acts as the flow-blocking member and when it is repositioned relative to the port 212, air may flow through the port 212 to reach the microphone 122 and/or speaker 124.

With continued reference to FIG. 9C, the fluid repelling member 232 may stretch along with the movement of the selectable component 210. This allows fluids, such as water, to be repelled and substantially prevented from reaching certain components within the cavity 130, even when the selectable component is compressed or in the open position.

Figure 10:
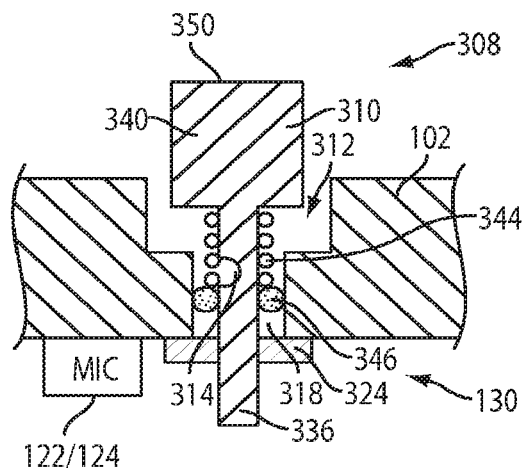
FIG. 10 is a cross-section view of the electronic device similar to FIG. 9B illustrating a forth example of the waterproof port assembly.
Figure 11:
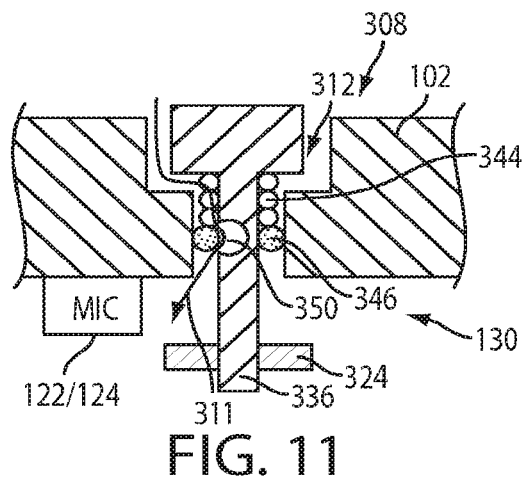
FIG. 11 is a cross-section view of the electronic device of FIG. 10 illustrating a force applied to the selectable component.

FIGS. 10 and 11 illustrate another example of the waterproof assembly including the selectable component received in the input port. With reference to FIG. 10, in this example, the waterproof port assembly 308 may include a selectable component 310 positioned within the port 312. The selectable component 310 may include a main body 340 having a stem 336 and defining a user engagement surface 350. The stem 336 may be an elongated member that extends longitudinally from a bottom portion of the main body 340. The stem 336 may have a smaller diameter than the main body 340 and be configured to be received in the port 312. A flow recess 314, which may also be an aperture, may be defined in the stem 336. The flow recess 314 defines an area of a reduced diameter for the stem 336 and selectable component 310. As will be discussed in more detail below, the reduced diameter may create a flow pathway between a sealing member of the housing 102 and the selectable component 310. In other embodiments, the selectable component 310 may include a flow aperture defined through the stem.

With continued reference to FIG. 10, the waterproof port assembly 308 may further include a biasing member 344, a sealing member 346, and a retaining clip 423. The biasing member 344 is operably connected to the selectable component 310, and similar to the biasing member 144, acts to return the selectable component 310 to an initial position. The sealing member 346 may be an O-ring, seal cup, or other component configured to seal around the selectable component 310.

The retaining clip 324 acts to retain the selectable component 310 attached to the housing 102. For example, the retaining clip 324 may be a washer, C-clip, nut, or other fastening device. The retaining clip 324 may have a diameter that is larger than a diameter of the input port 312 or a portion of the input port 312 surrounding an end of the selectable component 310. The retaining clip 324 may allow some movement of the selectable component 310 relative to the housing 102, but may act as a stop mechanism to prevent the selectable component 310 from being removed from the assembly. For example, the retaining clip 324 may allow the selectable component 310 to move into and out of the cavity 130 of the housing 120 in response to an input force, but may prevent the selectable component 310 from being completely removed or becoming detached from the housing.

With continued reference to FIG. 10, in a first position, the selectable component 310 is positioned with the stem 336 extending through the port 316. The sealing member 346 extends around the stem 336 and seals against the internal sidewalls 318 defining the port 312. The sealing member 346 substantially prevents fluids and debris from entering into the cavity 130 via the port 312.

With reference to FIG. 11, as a force F is applied to the user engagement surface 350 of the selectable component 310, the selectable component 310 travels inwardly into the housing 102. The retaining clip 324 allows the stem 336 to extend into the cavity 130, moving the flow recess 314 further into the port 312 and become substantially aligned with the sealing member 346. As shown in FIG. 11, in this position, the flow recess 314 defines a flow pathway 311 for air to flow from the exterior of the housing 102 into the cavity 130 to reach the microphone 122. Similarly, in the compressed or activated position, the selectable component 310 defines the flow pathway 311 from the cavity 130, such as from the speaker 124, to the exterior of the housing 102. In particular, due to the reduced diameter of the stem 336 at the location of the flow recess 314, the sealing member 324 does not seal against the entire diameter of the stem 336. Thus, air can flow between the cavity 130 and the exterior of the housing along the stem 336 and the interior sidewall of the sealing member 346. When the input force F is removed, the biasing member (shown in FIG. 9C) returns the selectable component to its closed position.

Figure 12:
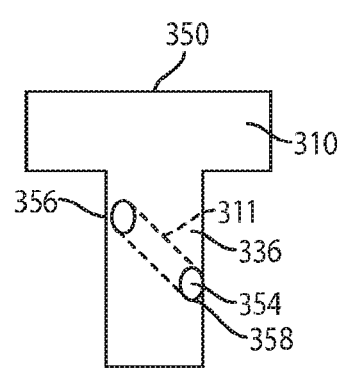
FIG. 12 is a front elevation view of another example of the selectable component of the waterproof port assembly of FIG. 10.

FIG. 12 is a side elevation view of the selectable component 310 of FIG. 10 including a flow aperture. With reference to FIG. 12, in embodiments where the selectable component 310 includes a flow aperture 354, the flow aperture 354 may include a first opening 356 at a first location and a second opening 358 at a second location that may be positioned lower on the stem 336 than the first location. In this example the flow path 311 may be defined through the selectable component 310, rather than around it as show in FIG. 11. With continued reference to FIG. 12, the first opening 356 functions as an inlet for the flow path 311 and the second opening 358 functions as an outlet for the flow path 311. To activate the port 312, the selectable component 310 may be compressed similar to FIG. 11, but in in this example, the selectable component 310 may be sufficiently depressed such that the second opening 358 is positioned below the sealing member 346 and the first opening 356 is positioned above the sealing member 346. Air can then travel through the flow path 311 defined in the selectable component 310 to reach the cavity 130.

Figure 13A:
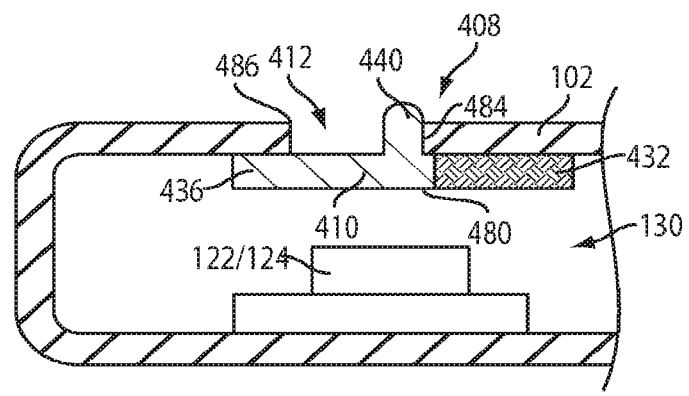
FIG. 13A is a cross-section view of the electronic device similar to FIG. 4 illustrating a fifth example of the waterproof port assembly.
Figure 13B:
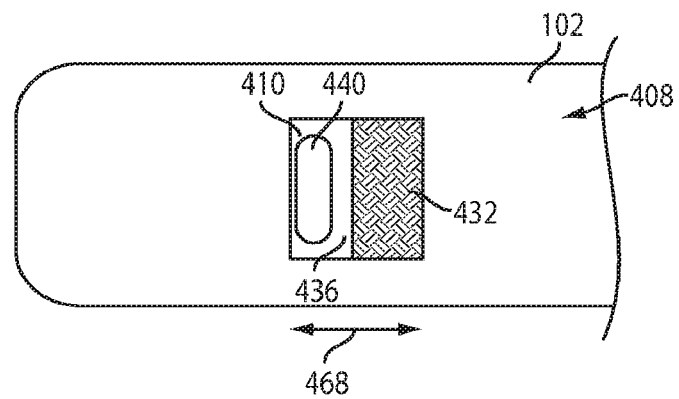
FIG. 13B is an enlarged top plan view of the waterproof port assembly of FIG. 13A in the open position.
Figure 13C:
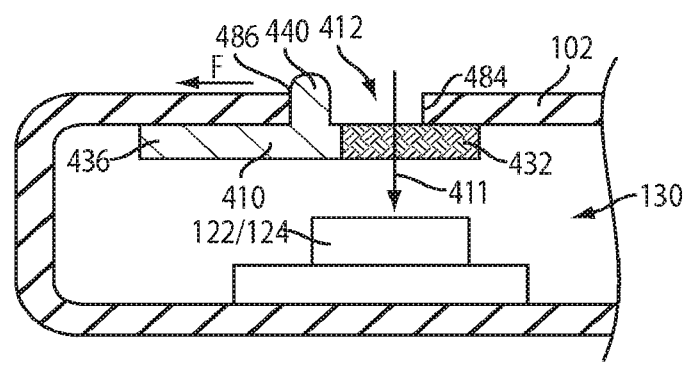
FIG. 13C is a cross-section view of the electronic device similar to FIG. 13A illustrating the waterproof port assembly in the open position.

In some embodiments, the flow-blocking member and/or the selectable component may be slidable. FIGS. 13A-13C illustrate an example of the waterproof port assembly 408 including a slidable selectable component 410. With reference initial to FIGS. 13A and 13C, the selectable component 410 may include a main body 436 defining a flow-blocking member for the port 412 and a gripping feature 440, such as a nub or protrusion, that extends from the main body 436. In this example, the main body 436 may be substantially planar and may be configured to extend across the entirety of the port 412. The gripping feature 440 extends from a top surface of the main body 436 and defines a user engagement surface to allow the user to move the selectable component 410 from a first position to a second position along a predetermined movement track 468 (see FIG. 13B).

A first end 480 of the selectable component 410 may be connected to a fluid repelling member 432, such as a water repellent mesh. The fluid repelling member 432 may be substantially similar to the fluid repelling member in the other examples, but may be configured to be movably connected to the selectable component 410.

With reference to FIG. 13A, in a first position, the selectable component 410 may be positioned to extend across the entire opening of the port 412. For example, the selectable component 410 may be positioned within the housing 102 to allow the main body 436 to extend between edges of the housing defining the port 412. In this position, the main body 436 forms a flow-blocking member to prevent fluid from entering into the cavity 130. In the closed position, the fluid repelling member 432 may be positioned within the housing 102 and adjacent to the port 412, but may not be in fluid communication with the port 412. For example, as shown in FIG. 13A, the fluid repelling member 432 may be positioned next to an edge of the port 412.

With reference to FIGS. 13B and 13C, to open the port 412, the user may apply a force F to the gripping feature 440, to move the selectable component 410 from the closed position shown in FIG. 13A to the open position shown in FIGS. 13B and 13C. In this position, the main body 436 may be moved horizontally along the track 468 and be positioned adjacent an edge of the port 412 and the fluid repelling member 432 may be moved into a position to be in fluid communication with the port 412. In one embodiment, the fluid repelling member 432 may be positioned to extend over at least a portion of the port 412. With reference to FIG. 13C, the gripping feature 440 may transition from being adjacent a first edge 484 of the port to being positioned against a second edge 486 of the port 412. In other words, the gripping portion 440 may translate across a length of the port 412 to be moved to the open position.

With reference to FIGS. 13B and 13C, in the open position, the main body 436 of the selectable component 410 may be only partially positioned within the port 412 and the fluid repelling member 432 may be positioned in remaining portion for the port 412. This allows a flow path 411 to be defined between an exterior of the housing into the cavity 130 via the port 412. Thus, sound waves can reach the microphone 122 within the cavity 130 and/or sound waves produced by the speaker 124 may travel through the port 412 to reach the exterior of the housing 102. To close the port, the user may provide a force to the finger grip 440 to move the main body into the closed position.

CONCLUSION

The foregoing description has broad application. For example, while examples disclosed herein may focus on a wearable electronic device, it should be appreciated that the concepts disclosed herein may equally apply to substantially any other type of electronic device. Similarly, although the waterproof port assembly may be discussed with response to a compressible button, the devices and techniques disclosed herein are equally applicable to other types of input structures. Accordingly, the discussion of any embodiment is meant only to be exemplary and is not intended to suggest that the scope of the disclosure, including the claims, is limited to these examples.

What is claimed is:

1. An electronic device comprising:
a housing defining a port and a cavity;
a processing element contained within the cavity of the housing;
an input/output device in selective communication with the port;
a flow-blocking member movably connected to the housing;
an actuator connected to the flow blocking member;
a fluid repelling member connected to the housing and positioned in a flow path between the port and the input/output device; and
a selectable component operative to:
move the actuator to move the flow-blocking member from an open position to a closed position to block flow through the port into the cavity; and
allow the actuator to move back to return the flow-blocking member from the open position to the closed position.

2. The electronic device of claim 1, wherein the selectable component is movable.

3. The electronic device of claim 2, wherein the selectable component is a compressible button or a slidable button.

4. The electronic device of claim 1, further comprising a biasing member operably connected to the flow-blocking member, wherein the biasing member exerts a return force on the flow-blocking member.

5. The electronic device of claim 4, wherein the biasing member is a spring.

6. The electronic device of claim 4, wherein the biasing member is a motor and exerts an open force to move the flow-blocking member to the open position and exerts the return force to move the flow-blocking member to the closed position.

7. The electronic device of claim 1, wherein the input/output device is a microphone or a speaker.

8. The electronic device of claim 1, further comprising
a user input sensor in communication with the processing element; and
an actuator operably connected to the flow-blocking member and in communication with the processing element; wherein
the user input sensor detects a user input and in response to the user input the processing element directs the actuator to move the flow-blocking member.

9. The electronic device of claim 1, wherein the fluid repelling member is a fluid repelling mesh.

10. The electronic device of claim 1, further comprising a display in communication with the processing element.

11. A portable electronic device comprising:
a housing defining a cavity;
a port defined in the housing that is in fluid communication with the cavity;
a sound wave transducer; and
a waterproof port assembly, comprising:
   a selectable component movably connected to the housing;
   an actuator connected to the selectable component;
   a biasing mechanism coupled to the actuator;
   a flow-blocking member operably connected to the actuator and selectively positioned between the port and the sound wave transducer;
wherein movement of the selectable component moves the actuator to:
   compress the biasing mechanism and move the flow-blocking member to an open position; or
   uncompress the biasing mechanism and move the flow-blocking member to a closed position.

12. The portable electronic device of claim 11, wherein the selectable component includes a base coupled to a main body having a smaller dimension than the base.

13. The portable electronic device of claim 12, wherein the base is operable to seal an aperture in the housing.

14. The portable electronic device of claim 13, further comprising an O-ring that seals against an inner surface of the housing.

15. The portable electronic device of claim 11, wherein movement of the selectable component causes movement of the sound wave transducer.

16. An electronic device comprising:
a housing defining a port and a cavity;
a processing element contained within the cavity of the housing;
an input/output device;
a flow-blocking member movably connected to the housing;
a fluid repelling member connected to the housing and positioned in a flow path between the port and the input/output device; and
a biasing member operably connected to the flow-blocking member; and
an actuator coupled to the flow-blocking member operative to:
   move the flow-blocking member to an open position; and
   allow the biasing member to move the flow blocking member from the open position to a closed position.

17. The electronic device of claim 16, wherein the biasing member is a spring.

18. The electronic device of claim 16, wherein the biasing member is a motor that exerts an open force to move the flow-blocking member to the open position.

19. The electronic device of claim 16, wherein the biasing member is a motor that exerts a return force to move the flow-blocking member to the closed position.

20. The electronic device of claim 16, wherein the biasing member exerts a return force on the flow-blocking member after a predetermined time period.

* * * * *